(12) United States Patent
Ueda et al.

(10) Patent No.: US 9,748,046 B2
(45) Date of Patent: *Aug. 29, 2017

(54) POWER STORAGE DEVICE

(71) Applicant: Murata Manufacturing Co., Ltd., Nagaokakayo-shi, Kyoto-fu (JP)

(72) Inventors: Yasuhiko Ueda, Nagaokakyo (JP); Keiji Horikawa, Nagaokakyo (JP); Mami Aoki, Nagaokakayo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,802

(22) Filed: May 19, 2015

(65) Prior Publication Data
US 2015/0248970 A1 Sep. 3, 2015

Related U.S. Application Data

(63) Continuation of application No. PCT/JP2013/075507, filed on Sep. 20, 2013.

(30) Foreign Application Priority Data

Nov. 29, 2012 (JP) .................. 2012-260678

(51) Int. Cl.
*H01G 11/28* (2013.01)
*H01G 11/80* (2013.01)
(Continued)

(52) U.S. Cl.
CPC ............ *H01G 11/28* (2013.01); *H01G 11/12* (2013.01); *H01G 11/70* (2013.01); *H01G 11/72* (2013.01);
(Continued)

(58) Field of Classification Search
CPC ........ H01G 11/28; H01G 11/58; H01G 11/70; H01G 11/12; H01G 11/52; H01G 11/66;
(Continued)

(56) References Cited

U.S. PATENT DOCUMENTS 4,562,511 A 12/1985 Nishino et al.
5,907,472 A * 5/1999 Farahmandi ........... H01G 9/038
361/502

(Continued)

FOREIGN PATENT DOCUMENTS

JP S59-48917 A 3/1984
JP 2011-66378 A 3/2011

(Continued)

OTHER PUBLICATIONS

International Search Report issued for PCT/JP2013/075507, date of mailing Nov. 5, 2013.
Written Opinion of the International Searching Authority issued or PCT/JP2013/075507, date of mailing Nov. 5, 2013.

*Primary Examiner* — Dion R Ferguson
(74) *Attorney, Agent, or Firm* — Arent Fox LLP

(57) ABSTRACT

A power storage device that includes a first adhesive member between a first current collector and a second surface layer, and a second adhesive member between a second current collector and a first surface layer. A first electrolyte retaining layer is provided between the first adhesive member and the first current collector. A second electrolyte retaining layer is provided between the second adhesive member and the second current collector.

7 Claims, 2 Drawing Sheets

(51) Int. Cl.
  *H01G 11/12* (2013.01)
  *H01G 11/70* (2013.01)
  *H01G 11/72* (2013.01)
  *H01M 2/30* (2006.01)
  *H01M 10/04* (2006.01)
  *H01M 10/0585* (2010.01)

(52) U.S. Cl.
  CPC ............. *H01G 11/80* (2013.01); *H01M 2/30* (2013.01); *H01M 10/0463* (2013.01); *H01M 10/0468* (2013.01); *H01M 10/0585* (2013.01); *Y02E 60/13* (2013.01)

(58) Field of Classification Search
  CPC ........ H01G 11/10; H01G 11/26; H01G 11/72; H01G 11/80; H01G 9/02; H01G 9/058; H01G 11/22; H01G 9/016; H01G 9/035
  See application file for complete search history.

(56) References Cited

U.S. PATENT DOCUMENTS

| | | | |
|---|---|---|---|
| 6,576,365 B1 † | 6/2003 | Meitav | |
| 8,369,065 B2 * | 2/2013 | Cho | H01G 9/016 361/502 |
| 2010/0304191 A1 | 12/2010 | West et al. | |
| 2011/0069426 A1 * | 3/2011 | Cho | H01G 9/016 361/502 |
| 2013/0122350 A1 * | 5/2013 | Hagiwara | H01G 11/12 429/163 |
| 2015/0221448 A1 * | 8/2015 | Horikawa | H01M 10/0413 361/502 |

FOREIGN PATENT DOCUMENTS

JP  2012-33907 A   2/2012
JP  2012-524980 A  10/2012

\* cited by examiner
† cited by third party

POWER STORAGE DEVICE

CROSS REFERENCE TO RELATED APPLICATIONS

The present application is a continuation of International application No. PCT/JP2013/075507, filed Sep. 20, 2013, which claims priority to Japanese Patent Application No. 2012-260678, filed Nov. 29, 2012, the entire contents of each of which are incorporated herein by reference.

FIELD OF THE INVENTION

The present invention relates to a power storage device or the like.

BACKGROUND OF THE INVENTION

Conventionally, various power storage devices are known such as electric double layer capacitors and secondary batteries. An example thereof is described in, for example, Patent Document 1. The power storage device described in Patent Document 1 includes: a first internal electrode extracted to a first end surface; a second internal electrode extracted to a second end surface; and a separator placed between the first internal electrode and the second internal electrode. The first and second internal electrodes as well as the separator, excluding the extracted parts of the first and second internal electrodes, are surrounded by an adhesive member. This adhesive member integrates the first and second internal electrodes as well as the separator. In the power storage device described in Patent Document 1, both a current collector layer and an active material layer of the first internal electrode are extracted to the first end surface. Both a current collector layer and an active material layer of the second internal electrode are extracted to the second end surface. The adhesive member directly adheres to the extracted part of the first internal electrode to the first end surface. The adhesive member directly adheres to the extracted part of the second internal electrode to the second end surface.

Patent Document 1: Japanese Patent Application Laid-Open No. 2012-33907

SUMMARY OF THE INVENTION

There is demand for improved output characteristics of power storage devices.

A main object of the present invention is to provide a power storage device which is excellent in output characteristics.

A power storage device according to the present invention includes a device main body. The device main body has first and second principal surfaces, first and second side surfaces, and first and second end surfaces. The first and second principal surfaces extend in the length direction and the width direction. The first and second side surfaces extend in the length direction and the thickness direction. The first and second end surfaces extend in the width direction and the thickness direction. The device main body includes a first internal electrode, a second internal electrode, a first electrolyte retaining layer, a second electrolyte retaining layer, a first surface layer, and a second surface layer. The first internal electrode is extracted to the first end surface. The first internal electrode is not extracted to the second end surface. The second internal electrode is opposed to the first internal electrode in the thickness direction. The second internal electrode is extracted to the second end surface. The second internal electrode is not extracted to the first end surface. The first electrolyte retaining layer is placed on a surface of the first internal electrode, which is closer to the second internal electrode. The first electrolyte retaining layer retains an electrolyte. The second electrolyte retaining layer is placed on a surface of the second internal electrode, which is closer to the first internal electrode. The second electrolyte retaining layer retains the electrolyte. The first surface layer is provided on a surface of the first internal electrode on the side opposite to the first electrolyte retaining layer. The second surface layer is provided on a surface of the second internal electrode on the side opposite to the second electrolyte retaining layer. The first internal electrode has a first current collector and a first active material layer. The first active material layer is provided on a surface of the first current collector, which is closer to the first electrolyte retaining layer. The second internal electrode has a second current collector and a second active material layer. The second active material layer is provided on a surface of the second current collector, which is closer to the second electrolyte retaining layer. The power storage device according to the present invention further includes a first adhesive member and a second adhesive member. The first adhesive member is placed between the first current collector and the second surface layer, in a location closer to the first end surface than to the second internal electrode in the length direction. The second adhesive member is placed between the second current collector and the first surface layer, in a location closer to the second end surface than to the first internal electrode in the length direction. The first electrolyte retaining layer is provided between the first adhesive member and the first current collector. The second electrolyte retaining layer is provided between the second adhesive member and the second current collector.

In a particular aspect of the power storage device according to the present invention, the first and second internal electrodes are not provided at either end of the device main body in the width direction. At both ends of the device main body in the width direction, the first adhesive member has contact with the second adhesive member. The adhesive power between the first adhesive member and the first electrolyte retaining layer and the adhesive power between the second adhesive member and the second electrolyte retaining layer are each lower than the adhesive power between the first adhesive member and the second adhesive member.

In another particular aspect of the power storage device according to the present invention, the first active material layer is provided between the first current collector and the first adhesive member. The second active material layer is provided between the second current collector and the second adhesive member.

In other particular aspect of the power storage device according to the present invention, the power storage device is an electric double layer capacitor in which the first and second active material layers are each composed of a polarizable electrode.

According to the present invention, a power storage device can be provided which is excellent in output characteristics.

DETAILED DESCRIPTION OF THE INVENTION

Figure 1:
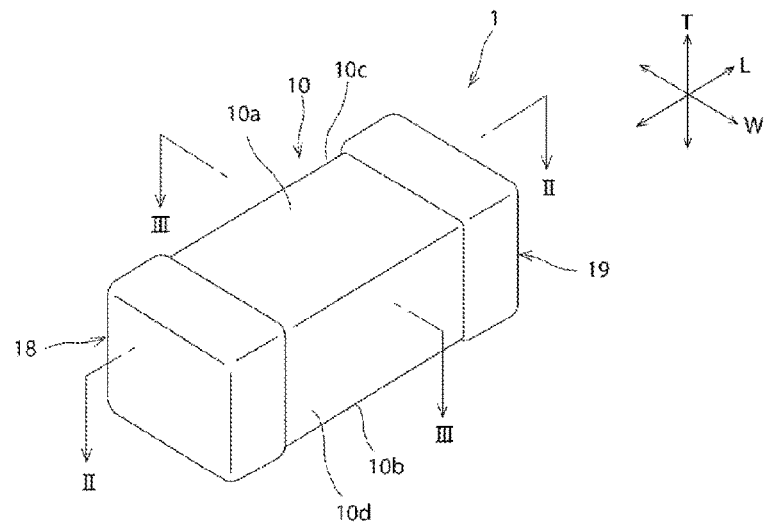
FIG. 1 is a schematic perspective view of a power storage device according to an embodiment of the present invention.

An example of a preferred embodiment in the practice of the present invention will be described below. However, the following embodiment is provided merely by way of example. The present invention is not limited to the following embodiment in any way.

Furthermore, members that have a substantially identical function shall be denoted by an identical reference symbol in the respective drawings referenced in the embodiment and the like. In addition, the drawings referenced in the embodiment and the like are shown schematically. The dimensional ratios and the like of the objects drawn in the drawings may different from the dimensional ratios and the like of real objects.

The dimensional ratios and the like of the objects may be also different between the drawings. The dimensional ratios and the like of specific objects should be determined in view of the following description.

Figure 2:
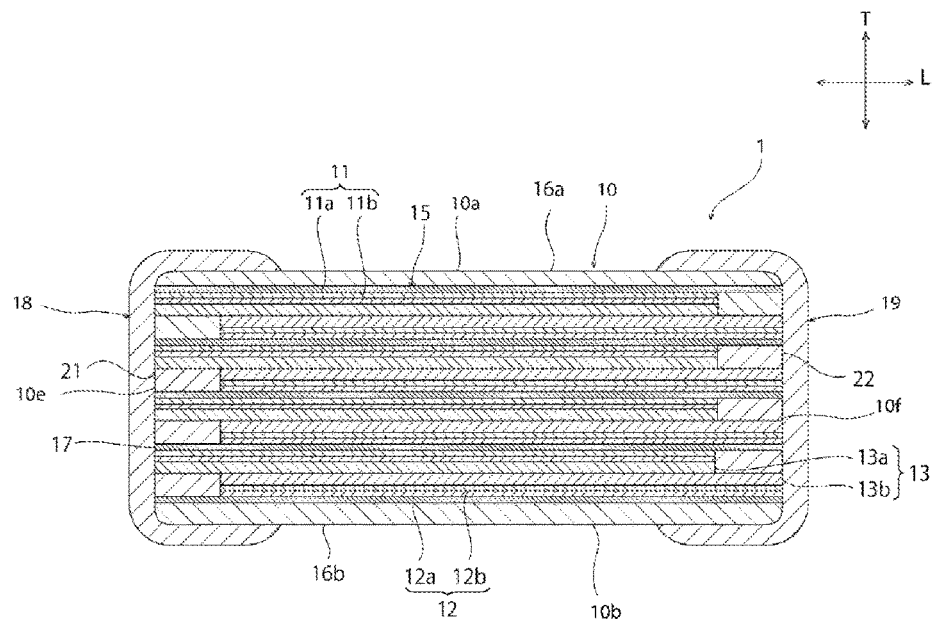
FIG. 2 is a schematic cross-sectional view of FIG. 1 along the line II-II.
Figure 3:
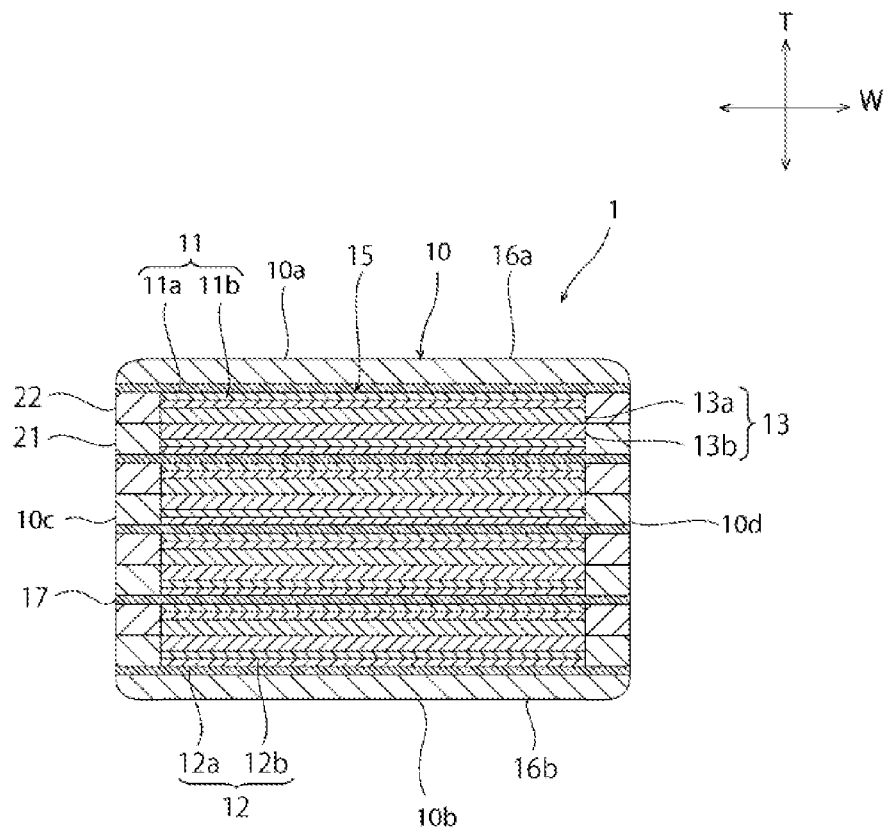
FIG. 3 is a schematic cross-sectional view of FIG. 1 along the line III-III.

FIG. 1 is a schematic perspective view of a power storage device according to the present embodiment. FIG. 2 is a schematic cross-sectional view of FIG. 1 along the line II-II. FIG. 3 is a schematic cross-sectional view of FIG. 1 along the line III-III.

The power storage device 1 shown in FIGS. 1 to 3 is a device constituting, for example, an electric double layer capacitor or a secondary battery.

The power storage device 1 includes a device main body 10. The device main body 10 has first and second principal surfaces 10a, 10b, first and second side surfaces 10c, 10d, and first and second end surfaces 10e, 10f. The first and second principal surfaces 10a, 10b are each provided in the length direction L and the width direction W. The first principal surface 10a and the second principal surface 10b are opposed in the thickness direction T. The first and second side surfaces 10c, 10d are each provided in the length direction L and the thickness direction T. The first side surface 10c and the second side surface 10d are opposed in the width direction W. The first and second end surfaces 10e, 10f are each provided in the width direction W and the thickness direction T. The first end surface 10e and the second end surface 10f are opposed in the length direction L. In the present embodiment, the device main body 10 is provided in a substantially cuboid shape. Specifically, the device main body 10 is provided in a cuboid shape with corners and ridges rounded.

As shown in FIGS. 2 and 3, the device main body 10 has a first internal electrode 11 and a second internal electrode 12. The first internal electrode 11 is provided parallel to the first and second principal surfaces 10a, 10b. The first internal electrode 11 is extracted to the first end surface 10e, but not extracted to the second end surface 10f, or the first and second side surfaces 10c, 10d.

The first internal electrode 11 has a first current collector 11a and a first active material layer 11b. The first current collector 11a can be composed of, for example, metal foil of at least one metal such as aluminum and copper. The first current collector 11a can be, for example, approximately 20 µm in thickness.

The first active material layer 11b is provided on a surface of the first current collector 11a, which is closer to the second internal electrode 12. The first active material layer 11b is a member constituting a polarizable electrode, when the power storage device 1 constitutes an electric double layer capacitor. In this case, the first active material layer 11b preferably contains a carbon material such as activated carbon.

The second internal electrode 12 is provided parallel to the first and second principal surfaces 10a, 10b. The second internal electrode 12 is extracted to the second end surface 10f, but not extracted to the first end surface 10e, or the first and second side surfaces 10c, 10d.

The second internal electrode 12 has a second current collector 12a and a second active material layer 12b. The second current collector 12a can be composed of, for example, metal foil of at least one metal such as aluminum and copper. The second current collector 12a can be, for example, approximately 20 µm in thickness.

The second active material layer 12b is provided on a surface of the second current collector 12a, which is closer to the first internal electrode 11. More specifically, the first and second internal electrodes 11, 12 are provided so that the first active material layer 11b is opposed to the second active material layer 12b. The second active material layer 12b is a member constituting a polarizable electrode, when the power storage device 1 constitutes an electric double layer capacitor. In this case, the second active material layer 12b preferably contains a carbon material such as activated carbon.

An electrolyte retaining layer 13 retaining an electrolyte is placed between the first internal electrode 11 and the second internal electrode 12. The first internal electrode 11 and the second internal electrode 12 are opposed with the electrolyte retaining layer 13 interposed therebetween. The first internal electrode 11 and the second internal electrode 12 are separated by the electrolyte retaining layer 13. The electrolyte retaining layer 13 is not particularly limited, as long as the layer can retain an electrolyte between the first internal electrode 11 and the second internal electrode 12, and restrict the first internal electrode 11 from being brought into direct contact with the second internal electrode 12. The electrolyte retaining layer 13 can be composed of, for example, a separator composed of a porous body of an insulating material, or a gel electrolyte layer. The separator can be composed of, for example, a porous film of polyethylene terephthalate (PET).

The electrolyte includes a cation, an anion, and a solvent. Cations preferably used include, for example, tetraethylammonium salts. Anions preferably used include, for example, a tetrafluoroboric acid ion ($BF^{4-}$) and bis(trifluoromethylsulfonyl)imide (($CF_3SO_2)_2N$). Solvents preferably used include non-aqueous solvents such as propylene carbonate, ethylene carbonate, diethyl carbonate, and dimethyl carbonate, and aqueous solvents such as water.

The electrolyte retaining layer 13 has a first electrolyte retaining layer 13a and a second electrolyte retaining layer 13b. The first electrolyte retaining layer 13a is placed on a surface of the first internal electrode 11, which is closer to the second internal electrode 12. More specifically, the first electrolyte retaining layer 13a is placed on the first active material layer 11b. On the other hand, the second electrolyte retaining layer 13b is placed on a surface of the second internal electrode 12, which is closer to the first internal electrode 11. More specifically, the second electrolyte retaining layer 13b is placed on the second active material layer 12b. The second electrolyte retaining layer 13b has contact with the first electrolyte retaining layer 13a.

The electrolyte retaining layer 13 as well as the first and second internal electrodes 11, 12 constitute a power storage element 15. In the present embodiment, the power storage device 1 includes a plurality of power storage elements 15 stacked in the thickness direction T. The power storage elements 15 adjacent to each other in the thickness direction T adhere to each other with an adhesive layer 17.

A first surface layer 16a is placed on the upper surface of the stacked body of the plurality of power storage elements 15. A second surface layer 16b is placed on the lower surface of the stacked body of the plurality of power storage elements 15. In the present embodiment, because of the plurality of power storage elements 15 provided, the first surface layer 16a is provided on a surface of the first internal electrode 11 of the uppermost power storage element 15 on the side opposite to the first electrolyte retaining layer 13a. The second surface layer 16b is provided on a surface of the second internal electrode 12 of the lowermost power storage element 15 on the side opposite to the second electrolyte retaining layer 13b. At least one power storage element 15 is provided between a surface of the second internal electrode 12 of the uppermost power storage element 15 on the side opposite to the second electrolyte retaining layer 13b and the second surface layer 16b. The first and second surface layers 16a, 16b respectively adhere to the power storage elements 15 with the adhesive layer 17.

As shown in FIG. 2, a first external electrode 18 is provided on the first end surface 10e. The first external electrode 18 is electrically connected to the first internal electrode 11. It is to be noted that the first external electrode 18 is located on from the first end surface 10e even to the first and second principal surfaces 10a, 10b as well as the first and second side surfaces 10c, 10d in the present embodiment.

A second external electrode 19 is provided on the second end surface 10f. The second external electrode 19 is electrically connected to the second internal electrode 12. It is to be noted that the second external electrode 19 is located on from the second end surface 10f even to the first and second principal surfaces 10a, 10b as well as the first and second side surfaces 10c, 10d in the present embodiment.

The first and second external electrodes 18, 19 can be each composed of, for example, at least one metal such as aluminum and copper.

Each power storage element 15 is provided with a first adhesive member 21 and a second adhesive member 22. The power storage elements 15 are integrated with the first and second adhesive members 21, 22.

The first adhesive member 21 is provided in a location closer to the first end surface 10e than to the second internal electrode 12 in the length direction L. The part of the first adhesive member 21, which is located closer to the first end surface 10e than to the second internal electrode 12 in the length direction L, is placed between the first current collector 11a and the second surface layer 16b. For the power storage elements 15 excluding the lowermost power storage element 15, the part of the first adhesive member 21, which is located closer to the first end surface 10e than to the second internal electrode 12 in the length direction L, is placed between the first current collector 11a and the power storage element 15 located under the power storage element 15 in question. In addition, the first adhesive member 21 is also provided on both sides of the second internal electrode 12 and second electrolyte retaining layer 13b in the width direction W.

The second adhesive member 22 is provided in a location closer to the second end surface 10f than to the first internal electrode 11 in the length direction L. The part of the second adhesive member 22, which is located closer to the second end surface 10f than to the first internal electrode 11 in the length direction L, is placed between the second current collector 12a and the first surface layer 16b. For the power storage elements 15 excluding the uppermost power storage element 15, the part of the second adhesive member 22, which is located closer to the second end surface 10f than to the first internal electrode 11 in the length direction L, is placed between the second current collector 12a and the power storage element 15 located above the power storage element 15 in question.

In addition, the second adhesive member 22 is also provided on both sides of the first internal electrode 11 and first electrolyte retaining layer 13a in the width direction W. At both sides of the first and second internal electrodes 11, 12 in the width direction W, the first adhesive member 21 and second adhesive member 22 are in contact and adhere to each other. The adherence between the first adhesive member 21 and the second adhesive member 22 at the both sides of the first and second internal electrodes 11, 12 in the width direction W integrates the first internal electrode 11, first electrolyte retaining layer 13a, second electrolyte retaining layer 13b, and second internal electrode 12 for each power storage element 15.

In this regard, the electrolyte retaining layer is a member that restricts the contact between the first internal electrode and the second internal electrode, and may be thus provided only in the region where the first internal electrode is opposed to the second internal electrode. Accordingly, from the perspective of reducing the cost of the electrolyte retaining layer, it is common to provide the electrolyte retaining layer only in the region where the first internal electrode is opposed to the second internal electrode. In that case, the first adhesive member adheres to the first internal electrode, whereas the second adhesive member adheres to the second internal electrode. The inventors have found, as a result of earnest studies, that when the adhesive member adheres to the electrode, stress from the adhesive member is applied to the internal electrode, in particular, the current collector, for example, in pressing for the stack or at the increased temperature of the power storage device 1 to physically deform the current collector, and increase the electrical resistance of the internal electrode. The increased electrical resistance of the internal electrode leads to degraded output characteristics of the power storage device.

The power storage device 1 herein has the first electrolyte retaining layer 13a provided between the first adhesive member 21 and the first internal electrode 11. For this reason, the first electrolyte retaining layer 13a functions as a buffer member, thereby restricting stress from the first adhesive member 21 from being transmitted directly to the first internal electrode 11. In addition, the second electrolyte retaining layer 13b is provided between the second adhesive member 22 and the second internal electrode 12. For this reason, the second electrolyte retaining layer 13b functions as a buffer member, thereby restricting stress from the second adhesive member 22 from being transmitted directly to the second internal electrode 12. Accordingly, damage to the first and second current collector 11a, 12a is effectively suppressed at the time of manufacture or at the increased temperature of the power storage device 1. Therefore, the power storage device 1 can be achieved which is excellent in output characteristics.

From the perspective of making it harder to transmit stress from the adhesive members 21, 22 to the electrodes 11, 12, the first active material layer 11b is preferably provided between the first current collector 11a and the first adhesive member 21, whereas the second active material layer 12b is preferably provided between the second current collector 12a and the second adhesive member 22.

The adhesive power between the first adhesive member 21 and the first electrolyte retaining layer 13a, and the adhesive power between the second adhesive member 22 and the second electrolyte retaining layer 13b are each preferably low from the perspective of reducing the stress applied from the adhesive members 21, 22 to the electrodes 11, 12. The adhesive power between the first adhesive member 21 and the first electrolyte retaining layer 13a and the adhesive power between the second adhesive member 22 and the second electrolyte retaining layer 13b are each preferably lower than the adhesive power between the first adhesive member 21 and the second adhesive member 22. The adhesive power between the first adhesive member 21 and the first electrolyte retaining layer 13a and the adhesive power between the second adhesive member 22 and the second electrolyte retaining layer 13b are each preferably 1 or less times, more preferably 0.5 or less times as high as the adhesive power between the first adhesive member 21 and the second adhesive member 22.

While the first internal electrode 11 and the second internal electrode 12 are alternately stacked from the first surface layer 16a toward the second surface layer 16b in the present embodiment, the order of stacking the first and second internal electrodes 11, 12 is not limited to this alternate ordering. There may be a first internal electrode 11→a second internal electrode 12→a second internal electrode 12→a first internal electrode 11→a first internal electrode 11→a second internal electrode 12→a second internal electrode 12→a first internal electrode 11 in order from the first surface layer 16a. In this stacking form, the internal electrodes of the same polarity are adjacent to each other with the adhesive layer 17 interposed therebetween. Therefore, short circuit between the first internal electrode 11 and the second internal electrode 12 can be reliably suppressed, even when the adhesive layer 17 is thin.

An example of the power storage device including a plurality of power storage elements has been described in the embodiment. However, the present invention is not limited to this configuration. The power storage device may have only one power storage element.

DESCRIPTION OF REFERENCE SYMBOLS 1 power storage device
10 device main body
10a first principal surface
10b second principal surface
10c first side surface
10d second side surface
10e first end surface
10f second end surface
11 first internal electrode
11a first current collector
11b first active material layer
12 second internal electrode
12a second current collector
12b second active material layer
13 electrolyte retaining layer
13a first electrolyte retaining layer
13b second electrolyte retaining layer
15 power storage element
16a first surface layer
16b second surface layer
17 adhesive layer
18 first external electrode
19 second external electrode
21 first adhesive member
22 second adhesive member

The invention claimed is:

1. A power storage device comprising:
a device main body having first and second principal surfaces extending in a length direction and a width direction, first and second side surfaces extending in the length direction and a thickness direction, and first and second end surfaces extending in the width direction and the thickness direction;
a first internal electrode extracted to the first end surface, but not extracted to the second end surface;
a second internal electrode opposed to the first internal electrode in the thickness direction, the second internal electrode extracted to the second end surface, but not extracted to the first end surface;
a first electrolyte retaining layer on a first surface of the first internal electrode adjacent to the second internal electrode, the first electrolyte retaining layer retaining an electrolyte;
a second electrolyte retaining layer on a first surface of the second internal electrode adjacent to the first internal electrode, the second electrolyte retaining layer retaining the electrolyte;
a first surface layer on a second surface of the first internal electrode opposite to the first electrolyte retaining layer; and
a second surface layer provided on a second surface of the second internal electrode opposite to the second electrolyte retaining layer, wherein
the first internal electrode comprises:
a first current collector; and
a first active material layer on a first surface of the first current collector adjacent to the first electrolyte retaining layer, and
the second internal electrode comprises:
a second current collector; and
a second active material layer on a first surface of the second current collector adjacent to the second electrolyte retaining layer,
the power storage device further comprising:
a first adhesive member between the first current collector and the second surface layer in a location closer to the first end surface than to the second internal electrode in the length direction; and
a second adhesive member between the second current collector and the first surface layer in a location closer to the second end surface than to the first internal electrode in the length direction, wherein
the first electrolyte retaining layer is between the first adhesive member and the first current collector, and
the second electrolyte retaining layer is between the second adhesive member and the second current collector.

2. The power storage device according to claim 1, wherein
the first and second internal electrodes are not provided at either of the first and second side surfaces of the device main body,
the first adhesive member contacts the second adhesive member along both of the first and second side surfaces of the device main body, and
a first adhesive power between the first adhesive member and the first electrolyte retaining layer and a second adhesive power between the second adhesive member and the second electrolyte retaining layer are each lower than a third adhesive power between the first adhesive member and the second adhesive member.

3. The power storage device according to claim 1, further comprising:
   a first external electrode on the first end surface of the device main body and electrically connected to the first internal electrode; and
   a second external electrode on the second end surface of the device main body and electrically connected to the second internal electrode.

4. The power storage device according to claim 1, wherein the power storage device is an electric double layer capacitor in which the first and second active material layers each comprise a polarizable electrode.

5. A power storage device comprising:
   a device main body having first and second principal surfaces extending in a length direction and a width direction, first and second side surfaces extending in the length direction and a thickness direction, and first and second end surfaces extending in the width direction and the thickness direction;
   a first internal electrode extracted to the first end surface, but not extracted to the second end surface;
   a second internal electrode opposed to the first internal electrode in the thickness direction, the second internal electrode extracted to the second end surface, but not extracted to the first end surface;
   a first electrolyte retaining layer on a first surface of the first internal electrode adjacent to the second internal electrode, the first electrolyte retaining layer retaining an electrolyte;
   a second electrolyte retaining layer on a first surface of the second internal electrode adjacent to the first internal electrode, the second electrolyte retaining layer retaining the electrolyte;
   a first surface layer on a second surface of the first internal electrode opposite to the first electrolyte retaining layer; and
   a second surface layer provided on a second surface of the second internal electrode opposite to the second electrolyte retaining layer, wherein
   the first internal electrode comprises:
      a first current collector; and
      a first active material layer on a first surface of the first current collector adjacent to the first electrolyte retaining layer, and
   the second internal electrode comprises:
      a second current collector; and
      a second active material layer on a first surface of the second current collector adjacent to the second electrolyte retaining layer,
   the power storage device further comprising:
      a first adhesive member between the first current collector and the second surface layer in a location closer to the first end surface than to the second internal electrode in the length direction; and
      a second adhesive member between the second current collector and the first surface layer in a location closer to the second end surface than to the first internal electrode in the length direction, wherein
   the first active material layer is between the first current collector and the first adhesive member, and
   the second active material layer is between the second current collector and the second adhesive member.

6. The power storage device according to claim 5, further comprising:
   a first external electrode on the first end surface of the device main body and electrically connected to the first internal electrode; and
   a second external electrode on the second end surface of the device main body and electrically connected to the second internal electrode.

7. The power storage device according to claim 5, wherein the power storage device is an electric double layer capacitor in which the first and second active material layers each comprise a polarizable electrode.

* * * * *